3,240,575
ACYLATED POLYAMINE COMPOSITION
Clark O. Miller, Willoughby, and Casper J. Dorer, Lyndhurst, Ohio, assignors to The Lubrizol Corporation, Wickliffe, Ohio, a corporation of Ohio
No Drawing. Filed Sept. 19, 1962, Ser. No. 224,843
13 Claims. (Cl. 44—66)

This invention relates to a new composition of matter and in a more particular sense it relates to nitrogen-containing compositions especially useful as additives in fuels such as hydrocarbon fuel oils and gasolines.

Hydrocarbon fuels are susceptible to deterioration in storage upon contact with air, moisture, or heat. The products of such deterioration often are corrosive to the metal parts coming into contact with the fuel. They also tend to form insoluble sludge-like or varnish-like deposits and cause clogging of filters, orifices, and fuel lines. It is thus desirable to incorporate into a fuel chemical additives which are capable of inhibiting deterioration of the oil or dispersing the deterioration products in the oil phase so as to prevent the formation of harmful deposits.

An additional difficulty is associated with the entrainment of small amounts of water in the fuel. In certain weather and operating conditions, the entrained water tends to form ice which obstructs the flow of the fuel in fuel lines or through orifices. For instance, the stalling of carbureted gasoline engines, particularly during cool, humid weather, often is caused by ice which forms near the circumference of the throttle plate.

It is, accordingly, an object of this invention to provide novel compositions of matter.

It is another object of this invention to provide compositions useful as additives in fuels.

It is another object of this invention to provide improved fuel compositions.

It is still another object of this invention to provide hydrocarbon fuel compositions for internal combustion engines.

It is still another object of this invention to provide hydrocarbon fuel compositions for burners.

These and other objects are achieved in accordance with this invention by providing a nitrogen-containing composition prepared by the process comprising mixing at a temperature from about 0° C. up to about 100° C. (A) an acidic reactant prepared by partially esterifying a succinic acid compound selected from the class consisting of alkenylsuccinic acids having at least about 8 carbon atoms in the alkenyl group and the anhydrides of said acids, with from about 0.1 to about 0.5 mole of a compound selected from the class consisting of lower aliphatic epoxides and lower aliphatic polyols, and (B) a basic reactant prepared by partially acylating at a temperature above about 100° C. an alkylene amine with an aliphatic carboxylic acid having at least about 12 carbon atoms and treating the partially acylated polyamine with from about 0.5 to about 5% by weight of a lower aliphatic epoxide at a temperature above about 100° C.

The acidic reactant of (A) is an alkenylsuccinic acid or anhydride partially esterified with an epoxide or a polyol. The alkenyl group of the alkenyl succinic acid or anhydride contains at least about 8 carbon atoms and preferably from about 10 to about 30 carbon atoms. It is derived preferably from an olefin, particularly a higher olefin obtained by the polymerization of a lower olefin such as ethylene, propene, 1-butene, or isobutene. An especially useful polymer is a polymer of propene or isobutene having a molecular weight from about 150 to about 350. Such a polymer is obtained by contacting the monomeric olefin with a Friedel-Crafts catalyst such as boron trifluoride, titanium tetrachloride, or aluminum chloride at a temperature from about —25° C. to 25° C. The polymerization may be carried out in the presence of a solvent such as butane, ethane, n-hexane, or cyclohexane.

The alkenylsuccinic acids or anhydrides are readily available from the reaction of maleic anhydride or itaconic anhydride with a suitable olefin or a chlorinated hydrocarbon such as a chlorinated olefin polymer described hereinabove. The reaction involves merely heating the reactants at a temperature of about 100°–300° C. The product is an alkenylsuccinic anhydride. It may be hydrolyzed by treatment with water or steam to the corresponding acid.

The lower aliphatic epoxides and polyols useful to prepare the partially esterified alkenylsuccinic acids, preferably contain less than about 8 carbon atoms. The epoxides are exemplified by ethylene oxide, propylene oxide, 1,2-butylene oxide, 2,3-butylene oxide, cyclohexene epoxide, and 1,2-octylene oxide. It may contain a polar substituent such as chloro, bromo, or ether radical, e.g., epichlorhydrin. The polyols are preferably glycols such as ethylene glycol, propylene glycol, 1,2-butylene glycol, 2,3-butylene glycol, trimethylene glycol, tetramethylene glycol, hexamethylene glycol, 1,2-octylene glycol, and 1,2-cyclohexene diol. Other polyols useful herein include, for example, glycerol, monomethyl ether of glycerol, pentaerythritol, etc.

The relative proportions of the alkenylsuccinic acid or anhydride and the epoxide or polyol used to prepare the partially esterified acid reactant of (A) are one mole of the acid or anhydride and from about 0.1 to about 0.5 mole of the epoxide or polyol. The temperature at which the partial esterification may be carried out is usually within the range from about 100° C. to about 300° C. The preferred temperature is from about 150° C. to about 250° C. Where an alkenylsuccinic acid is used as the reactant, water which may be formed as a by-product is removed by distillation as the esterification proceeds. Where an alkenylsuccinic anhydride is used as the reactant, from about 0.1 to about 1 mole of water per mole of the anhydride is preferably present in the esterification mixture so that any anhydride which has not been esterified is hydrolyzed to the corresponding acid.

The chemical constitution of the partially esterified alkenylsuccinic acid or anhydride of (A) is not known. It is believed, however, that it is a mixture of the alkenylsuccinic acid or anhydride with a substantial proportion of mono-(hydroxy-aliphatic) ester of the acid. It often contains additionally the di(hydroxy-aliphatic) ester of the acid or polyesters formed by the esterification of, e.g., more than one hydroxyl group of the polyol. It may also contain polymeric esters formed by the esterification of, e.g., more than one hydroxyl or epoxide group with more than one acid radical. The relative proportions of the individual components in the partially esterified alkenylsuccinic product depend to a large extent upon the reactants and their molar proportions used and the reaction conditions.

The basic reactant of (B) is a partially acylated polyamine obtained by the reaction of an alkylene amine with an aliphatic carboxylic acid. The alkylene amines useful to prepare this reactant include, for example, ethylene diamine, propylene diamine, trimethylene diamine, tetramethylene diamine, hexamethylene diamine, 1,2-butylene diamine, 2,3-butylene diamine, triethylene tetramine, tetramethylene pentamine, octamethylene diamine, pentaethylene hexamine, di(trimethylene) triamine, N-ethyl ethylene diamine, N,N-dimethyl propylene diamine, N-octadecyl ethylene diamine, and higher homologues thereof. The alkylene amines may also be cyclic amines such as piperazine, 1-(2-aminoethyl) piperazine, 2-methyl-1-(2-aminobutyl) piperazine, 2-heptyl-3-(2-aminopropyl) imidazoline, 4-methyl-3-(aminoethyl) imidazoline, 1,3-bis(2-aminoethyl) imidazoline, 1,4-bis(2-aminoethyl) piperazine, etc. The alkylene amines usually have from about 1 to about 10 carbon atoms and preferably from 2 to 4 carbon atoms in each alkylene radical.

The aliphatic carboxylic acids useful to prepare the basic reactant of (B) include, for the most part, monocarboxylic acids having from about 12 to about 30 carbon atoms. They may be saturated or unsaturated acids. Examples of such acids are dodecanoic acid, palmitic acid, oleic acid, stearic acid, linoleic acid, linolenic acid, naphthenic acid, chlorostearic acid, dichlorostearic acid, and commercially available acids such as obtained by the hydrolysis of tall oil, sperm oil, etc. The acids having from about 16 to about 30 carbon atoms are especially useful. They include, for example, naphthenic acids having a molecular weight of 200–400, oleic acid, stearic acid, and tall oil acid.

The term "acylation" is meant to indicate the reaction between the acid and the amine to form a linkage which may be representative of amides, imides, or amidines. The amidine linkages may be linear or cyclic, the latter being found in imidazolines. It will be noted that the basic reactant of (B) is a partially acylated alkylene amine, i.e., it contains at least one amino group which is free of the acyl substituent. Thus, for instance, where an alkylene amine having $n$ number of amino groups per molecule, the amount of the acid to be used usually will be ($n-1$) equivalents for each mole of the alkylene amine used. The preferred amount of the acid is such as to be sufficient to acylate about one-half the total amino groups in an alkylene amine. It will be noted, however, that the stoichiometry of the formation of an amidine linkage requires two amino groups for each acyl radical. Accordingly, the amount of the acid reactant may be as low as one equivalent for each two moles of the alkylene amine to form products having predominantly amidine linkages. On the other hand, the stoichiometry of the formation of an imide linkage requires two acyl radicals for one amino group to form products having predominantly imide linkages. The amount of the acid reactant may thus be as high as two equivalents for each equivalent of the alkylene amine used. The equivalent weight of the acid is based upon the number of the carboxylic acid radicals in the molecule and the equivalent weight of an alkylene amine is based upon the number of amino radicals in the molecule. To illustrate, a monocarboxylic acid has one equivalent per mole, ethylene diamine has two equivalents per mole, and tetraethylene pentamine has five equivalents per mole. Accordingly, one mole of triethylene tetramine may be partially acylated by reaction with as little as 0.5 equivalent of a carboxylic acid to form a product having predominantly amidine linkages or as much as two equivalents of a carboxylic acid for each equivalent of a primary amino group to form products having predominantly imide linkages.

The partial acylation may be illustrated by the reaction of octadecanoic acid with diethylene triamine and represented by the following equations.

A.
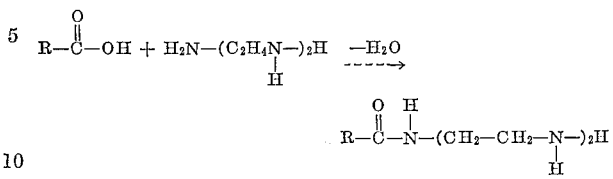

B.
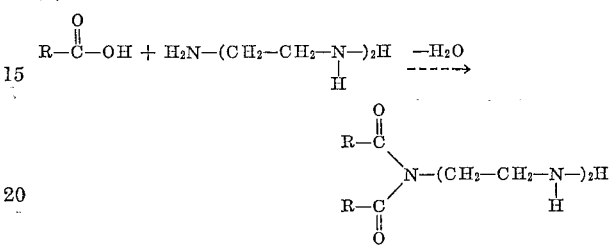

C.
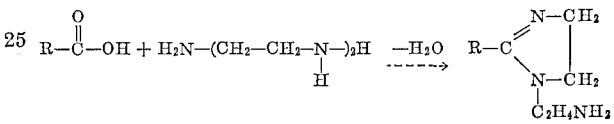

D.
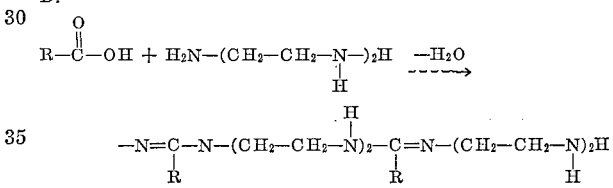

wherein R is a heptadecyl radical.

The partial acylation of the alkylene amine is carried out at a temperature above about 100° C., preferably above about 150° C. The upper limit of the temperature is determined by the decomposition point of the reaction mixture although it is seldom necessary to employ a temperature above about 300° C. A temperature above about 150° C. is preferred to give products having linear amidine or imidazoline linkages.

The treatment of the partially acylated polyamine with an epoxide to produce the basic reactant of (B) is usually carried out at a temperature from about 120° C., preferably above about 150° C. and below about 250° C. The epoxide suitable for use in the treatment is usually a lower aliphatic epoxide, i.e., having less than about 8 carbon atoms such as ethylene oxide, propylene oxide, 1,2-butylene oxide, 2,3-butylene oxide, epichlorohydrin, 1,2-hexylene oxide, cyclohexene epoxide, 1,2-octylene oxide, etc. The amount of the epoxide used in the treatment is usually from about 1% to about 5% by weight of the partially acylated polyamine. It is preferably about 3% of the partially acylated polyamine. A convenient method of the treatment is to introduce small increments of the epoxide to the partially acylated polyamine until the desired amount of the epoxide is incorporated therein. The treatment may be carried out in the presence of a solvent such as the hydrocarbon solvent or the polar solvent which may be used in the acylation of the polyamine.

The chemical composition of the product of the epoxide treated material is not fully understood. It is believed, however, that the product contains hydroxyalkylated derivative of the partially acylate polyamine.

The nitrogen-containing composition of this invention is obtained by mixing the acidic reactant of (A) and the basic reactant of (B) at a temperature from about 0° C. up to about 100° C. The preferred temperature is between about 50° C. and about 100° C. The reaction in most instances is slightly exothermic and is preferably carried out in the presence of a solvent. The solvent suitable for use in the reaction may be a hydrocarbon or a polar solvent such as benzene, naphtha, toluene, xylene, n-hexane, dioxane, chlorobenzene, kerosene, gasoline, or a fuel oil. Ordinarily about equivalent amounts of the two reactants are used to prepare the nitrogen containing composition of this invention, i.e., one equivalent of the acidic reactant is used for one equivalent of the basic reactant. The equivalent weight of the basic reactant is based upon the presence therein of the free amino groups, i.e., amino groups not containing an acyl substituent. A convenient method of determining the amount of free amino groups in the basic reactant is to measure its basicity by titration with hydrochloric acid. Similarly, the equivalent weight of the acidic reactant may be based upon titratable acidity. Thus, if the basic reactant of (B) contains two or more free amino groups, all of the amino groups are preferably made to react with the acidic reactant of (A). In some instances, however, only one of the amino groups of the basic reactant may be utilized in reaction with the acidic reactant to form the nitrogen-containing composition of this invention. For instance, if the basic reactant is a partially acylated triethylene tetramine in which only one of the four amino groups is acylated, the amount of the acidic reactant to be used may vary from one equivalent to three equivalents per mole of the partially acylated triethylene tetramine used, so that one, two, or all three of the free amino groups may be involved in the reaction.

The chemical constitution of the nitrogen-containing composition is not precisely understood. It is believed to consist predominantly of a salt formed between the acidic reactant of (A) and the basic reactant of (B). In many instances it also contains amide, imide, or an amidine product.

The following examples illustrate the preparation of the nitrogen-containing compositions of this invention as well as the reactants useful for preparing such compositions:

EXAMPLE 1

An acidic reactant of (A) is prepared as follows: A dodecenylsuccinic anhydride is prepared by heating maleic anhydride and propylene tetramer (1.2 moles per mole of maleic anhydride) at 150°–205° C. The anhydride is then distilled. The distillate, having an acid number of 390, is hydrolyzed with steam at 140° C. to the corresponding acid. To 2100 parts by weight (4.75 molar proportions) of a 4% mineral oil solution of the above acid there is added 127 parts (2.1 molar proportions) of propylene oxide at 74°–80° C. The product is a partially esterified acid having an acid number of 175.

EXAMPLE 2

A partially esterified alkenylsuccinic acid is prepared as follows: The distilled propylene tetramer-substituted succinic anhydride prepared as is described in Example 1 (443 parts by weight, 1.55 molar proportions) is heated to 88° C. whereupon propylene glycol (52.5 parts, 0.68 molar proportion) is added at this temperature in 30 minutes. The mixture is heated at 88°–90° C. for 2 hours and mixed with 14.5 parts (0.8 molar proportion) of water at 90°–99° C. for 1 hour. The mixture is dissolved in 300 parts of xylene and the resulting product is a xylene solution containing 63% of a partially esterified acid and having an acid number of 160.

EXAMPLE 3

A partially acylated polyamine reactant of (B) is prepared at follows: A mixture (565 parts by weight) of an alkylene amine mixture consisting of triethylene tetramine and diethylene triamine in weight ratio of 3:1 is added at 20°–80° C. to a mixture of equivalent amounts of a naphthenic acid having an acid number of 180 (1270 parts) and oleic acid (1110 parts; the total quantity of the two acids used is such as to provide one equivalent for each two equivalents of the amine mixture used). The reaction is exothermic. The mixture is blown with nitrogen while it is being heated to 240° C. in 4.5 hours and thereafter heated at this temperature for 2 hours. Water is collected as the distillate. To the above residue ethylene oxide (140 parts) is added at 170°–180° C. within a period of 2 hours while nitrogen is bubbled through the reaction mixture. The reaction mixture is then blown with nitrogen for 15 minutes and diluted with 940 parts of xylene to a solution containing 25% of xylene. The resulting solution has a nitrogen content of 5.4% and a base number of 82 at pH of 4, the latter being indicative of free amino groups.

EXAMPLE 4

A mixture of 178 parts of the xylene solution of the partially esterified succinic acid of Example 2 and 350 parts of the partially acylated polyamine of Example 3 containing 3% of a de-emulsifier is prepared at 26° C. and heated at 90° C. for 1 hour. The mixture is filtered. The filtrate is a 29% xylene solution of the nitrogen-containing composition of this invention having a nitrogen content of 3.3%.

EXAMPLE 5

A nitrogen-containing composition of this invention is prepared by the procedure of Example 4 except that twice the indicated amount of the partially acylated polyamine of Example 3 is used. The product is a 27% xylene solution having a nitrogen content of 4.2%.

EXAMPLE 6

A fuel composition is prepared by mixing a leaded gasoline with 0.0025% by weight of the partially esterified alkenylsuccinic acid of Example 1 and 0.004% by weight of the partially acylated polyamine of Example 3 at room temperature.

The nitrogen-containing compositions of this invention are useful as detergents, wetting agents, improving agents for asphalts or other bituminous materials, anti-rust agents, corrosion-inhibiting agents, etc. Their principal utility is as additives in hydrocarbon fuels to improve their combustion characteristics, corrosion-inhibiting properties, sludge-resistant properties, and resistance to carbureter icing. When used as improving agents for asphalts, the composition of this invention will generally be present in an amount ranging from about 0.1% to about 5% by weight. For the improvement of lubricating oils, especially mineral lubricating oils, generally from about 0.05% to about 10% of the nitrogen-containing compositions of this invention will be employed. A lubricant compounded, for example, from SAE 20 mineral oil plus 0.25% of the product of Example 4 serves as a corrosion-resistant and detergent automobile crankcase oil. The compositions of this invention are also useful as improving agents for the lubricating oil-fuel mixtures employed in the operation of two-cycle engines. In the liquid hydrocarbon fuel such as leaded gasoline, as little as 0.0001% of the nitrogen-containing composition is effective. For example, 0.0025% of the product of Example 4 added to a gasoline containing 3.5 milliliters per gallon of a commercial tetraethyl lead fluid is effective to reduce the instance of carbureter icing and to improve detergency and corrosion-resistance when such fuel is used in a gasoline engine. In most applications, it is seldom necessary to employ more than about 1% of the composition of this invention in a hydrocarbon fuel.

The bucking and stalling of carburetted gasoline engines particularly during cool, humid weather is often caused by ice which forms near the circumference of the throttle plate. The ice restricts the flow of the air-gasoline mixture into the combustion chambers and causes an idling engine to stall. The utility of the compositions of this invention as anti-icing agents for gasoline is shown by means of an engine carbureter icing test. The test involves operating a 6-cylinder Chevrolet passenger automobile engine fueled with the test gasoline at 1700–1800 r.p.m. and 45° F. in an atmosphere of 100% relative humidity until the quantity of ice formed around the throttle plate is such as to cause stalling of the engine at idling speed. The base fuel used in the test is a regular gasoline containing 1.6 milliliters per gallon of tetraethyl lead fluid. The results of the test are indicated in Table I below. A shorter test period before ice formation and stalling of the engine indicates an inferior anti-icing characteristic of the gasoline. It will be noted that the samples II and III, illustrating the present invention show improvement of as much as about 300% over the untreated samples.

Table I

| Test Sample | Additive in Gasoline (Percent by weight) | Period of Test Before Stalling (Minutes; two or more tests) |
| --- | --- | --- |
| I | None | 1.5–2.0. |
| II | 0.006% of the Product of Example 4. | >6, >6, >6, >6. |
| III | 0.004% of the Basic Reactant of Example 3 plus 0.002% of the Acidic Reactant of Example 2. | >6, 5.3, >6. |
| IV | 0.004% of the Basic Reactant of Example 3. | 1.3, 1.8. |
| V | 0.008% of the Basic Reactant of Example 3. | 2.75, 2.5, 2.5, 2.5. |
| VI | 0.002% of the Acidic Reactant of Example 2. | 4.3, 3.5. |
| VII | 0.006% of the Acidic Reactant of Example 2. | 4–>6. |

The additive of this invention is effective also to prevent corrosion of metals coming into contact with fuel oils contaminated with water or moisture. In this regard it will be noted that acidic substances present in a fuel oil are usually considered to accelerate corrosion. Thus, the corrosion-inhibiting characteristic of the additive of this invention is unique. This characteristic is associated with the chemical constitution of the olefin polymer substituent of the hydroxy compound from which the additive is derived. The corrosion-inhibiting characteristic is evaluated by the procedure of the MIL-I-25017 Test (modified ASTM D 665–54). In this test, a steel spindle is immersed in a mixture of 300 ml. of isooctane containing the additive and 30 ml. of water and the mixture is agitated by means of a stirrer (1000 r.p.m.) at 100° F. for 20 hours. At the end of the test the spindle is inspected for rust. The result is shown in Table II below:

Table II

Test sample: Rusted area of the spindle at end of the test
I. Isooctane _____ 100%, heavy rust.
II. 0.006% of the product of Example 4 _____ No rust.
III. 0.004% of the product of Example 4 _____ Do.

The nitrogen-containing compositions of this invention are also effective to impart detergent properties to fuels. Their effectiveness is shown by the fact that a gasoline containing such compositions has been found to exhibit a significantly reduced tendency, as compared to an untreated gasoline, to form blown-by deposits in the carburetors of, e.g., automobile engines.

What is claimed is:
1. A nitrogen-containing composition prepared by the process comprising mixing at a temperature from about 0° C. up to about 100° C. (A) one equivalent of an acidic reactant prepared by partially esterifying a succinic acid compound selected from the class consisting of alkenylsuccinic acids having at least about 8 carbon atoms in the alkenyl group and the anhydrides of said acids with from about 0.1 to about 0.5 mole of a compound selected from the class consisting of alkylene oxides having up to about 8 carbon atoms, epihalohydrins having up to about 8 carbon atoms, and polyhydric alcohols having up to about 8 carbon atoms, and (B) from about 1 to 3 equivalents of a basic reactant prepared by partially acylating at a temperature above about 100° C. an alkylene polyamine with up to one less equivalent than the number of amino groups in said polyamine of an aliphatic hydrocarbon carboxylic acid having at least about 12 carbon atoms and treating the partially acylated polyamine with from about 0.5 to about 5% by weight of an alkylene epoxide having up to about 8 carbon atoms at a temperature above about 100° C.

2. A nitrogen-containing composition prepared by the process comprising mixing at a temperature from about 0° C. up to about 100° C. (A) 1 equivalent of an acidic reactant prepared by partially esterifying an alkenylsuccinic acid having from about 8 to about 30 carbon atoms in the alkenyl group with about 0.5 mole of propylene glycol, and (B) from about 1 to 3 equivalents of a basic reactant prepared by partially acylating at a temperature above about 180° C. a polyethylene polyamine having from about 3 to about 6 amino groups per molecule with about one-half equivalent amount of an acid mixture comprising a naphthenic acid and a fatty acid, each said acid having a molecular weight within the range from about 200 to about 400, and treating the partially acylated polyamine with about 5% by weight of a lower alkylene oxide at a temperature above about 150° C.

3. A nitrogen-containing composition prepared by the process comprising mixing at a temperature from about 0° C. up to about 100° C. (A) 1 equivalent of an acidic reactant prepared by partially esterifying an alkenylsuccinic anhydride having from about 8 to about 30 carbon atoms in the alkenyl group with about 0.5 mole of propylene glycol, and (B) from about 1 to 3 equivalents of a basic reactant prepared by partially acylating at a temperature above about 180° C. a polyethylene polyamine having from about 3 to about 6 amino groups per molecule with about one-half equivalent amount of an acid mixture comprising a naphthenic acid and a fatty acid, each said acid having a molecular weight within the range from about 200 to about 400, and treating the partially acylated polyamine with about 5% by weight of a lower alkylene oxide at a temperature above about 150° C.

4. The nitrogen-containing composition of claim 2 characterized further in that the polyethylene polyamine in (B) is a mixture of diethylene triamine and triethylene tetramine.

5. The nitrogen-containing composition of claim 2 characterized further in that the acid mixture in (B) consists of about equivalent amounts of a naphthenic acid having a molecular weight of about 300 and oleic acid.

6. The nitrogen-containing composition of claim 2 characterized further in that the lower alkylene oxide in (B) is ethylene oxide.

7. A nitrogen-containing composition prepared by the process comprising mixing at a temperature between about 50° C. and about 100° C. (A) 1 equivalent of an acidic reactant prepared by partially esterifying at a temperature between about 100° C. and 250° C. dodecenylsuccinic acid with about 0.5 mole of propylene glycol in the presence of from about 0.1 to 1 mole of water, and (B) from about 1 to 3 equivalents of a basic reactant prepared by partially acylating at a temperature between about 180° C. and about 300° C. a polyamine mixture consisting of triethylene tetramine and diethylene diamine in a weight ratio of about 3 to 1, respectively, with about one-half equivalent amount of an acid mixture consisting of about equivalent amounts of naphthenic acid having a molecular weight of about 300 and oleic acid and removing the water formed thereby and treating the partially acylated polyamine mixture with about 3% by weight of ethylene oxide at a temperature between about 150° C. and about 200° C.

8. A fuel composition consisting essentially of a gasoline and from about 0.0001% to about 1% of the nitrogen-containing composition of claim 1.

9. A fuel composition consisting essentially of a gasoline and from about 0.0001% to about 1% of the nitrogen-containing composition of claim 2.

10. A fuel composition consisting essentially of a leaded gasoline and from about 0.0001% to about 1% of the nitrogen-containing composition of claim 7.

11. A fuel composition consisting essentially of a fuel oil and from about 0.0001% to about 1% of the nitrogen-containing composition of claim 1.

12. A concentrate suitable for addition to gasolines and fuel oils consisting essentially of a fluid, combustible hydrocarbon solvent and the nitrogen-containing composition of claim 1.

13. A concentrate suitable for addition to gasolines and fuel oils consisting essentially of a fluid, combustible hydrocarbon solvent and the nitrogen-containing composition of claim 8.

References Cited by the Examiner
UNITED STATES PATENTS

| | | | |
|---|---|---|---|
| 2,490,744 | 12/1949 | Trigg et al. | 252—392 |
| 2,568,876 | 9/1951 | White et al. | 44—66 |
| 2,629,649 | 2/1953 | Wachter et al. | 252—392 |
| 2,840,526 | 6/1958 | Keller | 252—392 |
| 2,941,943 | 6/1960 | Kirkpatrick et al. | 252—392 |
| 2,982,632 | 5/1961 | Andress | 44—56 |
| 3,037,051 | 5/1962 | Stromberg | 252—392 |

DANIEL E. WYMAN, *Primary Examiner.*